(No Model.)

S. WARNER & O. E. COOK.
TRACTION WHEEL.

No. 521,687. Patented June 19, 1894.

WITNESSES:
Chas. Nidy
C. Sedgwick

INVENTORS
S. Warner
O. E. Cook
BY Munn & Co
ATTORNEYS.

THE NATIONAL LITHOGRAPHING COMPANY,
WASHINGTON, D. C.

UNITED STATES PATENT OFFICE.

SYLVESTER WARNER AND OWEN E. COOK, OF WEST UNION, INDIANA.

TRACTION-WHEEL.

SPECIFICATION forming part of Letters Patent No. 521,687, dated June 19, 1894.

Application filed February 17, 1894. Serial No. 500,502. (No model.)

*To all whom it may concern:*

Be it known that we, SYLVESTER WARNER and OWEN E. COOK, both of West Union, in the county of Parke and State of Indiana, have invented a new and Improved Traction-Wheel, of which the following is a full, clear, and exact description.

The object of the invention is to provide a new and improved traction wheel, which is comparatively simple and durable in construction, designed for use on harvesting and other machines, traction engines, &c., and arranged to give the machine the proper traction at all times, so as to prevent slipping.

The invention consists principally of arms mounted yieldingly and fitted to slide loosely at their outer ends in the rim of the wheel.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
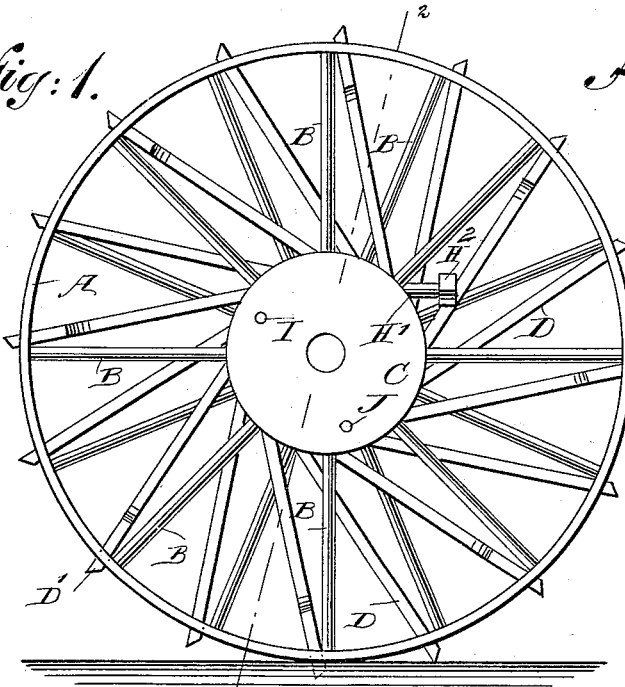
Figure 2:
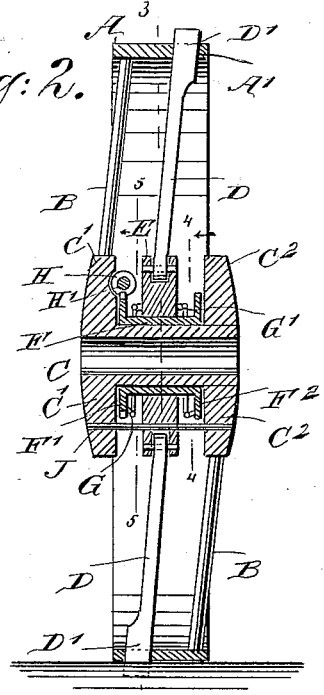
Figure 3:
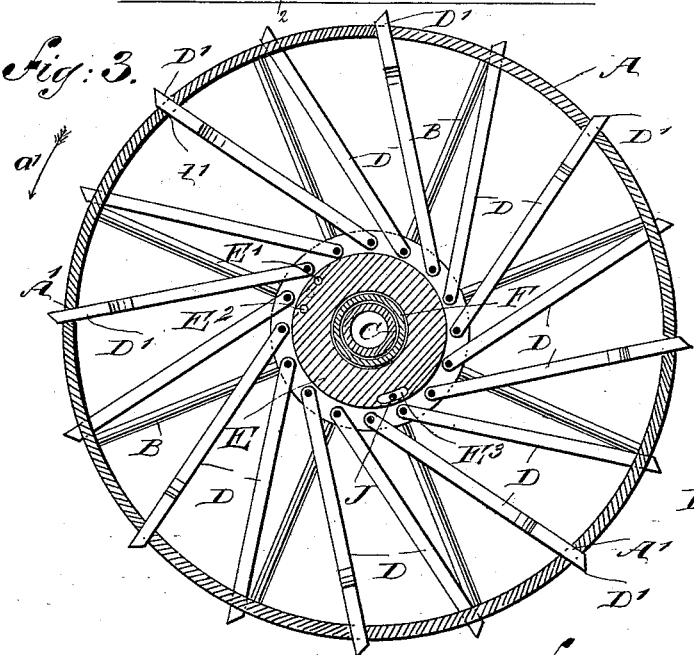
Figure 4:
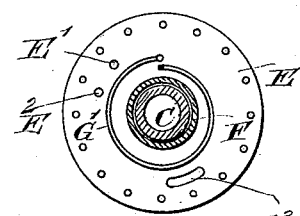
Figure 5:
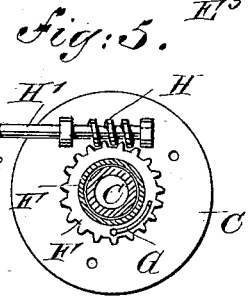

Figure 1 is a side elevation of the improvement. Fig. 2 is a transverse section of the same on the line 2—2 of Fig. 1. Fig. 3 is a sectional side elevation of the improvement on the line 3—3 of Fig. 2. Fig. 4 is a sectional side elevation of part of the improvement on the line 4—4 of Fig. 2. Fig. 5 is a similar view of the same on the line 5—5 of Fig. 2; and Fig. 6 is a broken plan view of part of the wheel rim.

The improved traction wheel is provided with a rim A, and the permanent spokes B for connecting the said rim with the flanges C' and C² of the hub C of the wheel.

Figure 6:
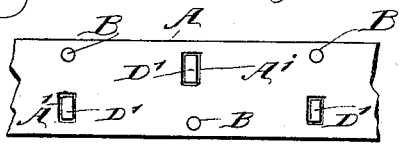

In the rim A of the wheel are arranged openings A', see Fig. 6, through which pass loosely the ends D' of slidable arms D pivotally-connected at their inner ends on a wheel E mounted to rotate loosely on a sleeve F fitted loosely on the hub C between its flanges C' and C², as plainly shown in Fig. 2. The outer extremities D' of the slidable arms D are preferably beveled, as plainly indicated in Figs. 1 and 3, and are adapted to project beyond the peripheral surface of the rim A, so as to readily pass into the ground to cause proper traction of the wheel. The faces of the wheel E are connected with coil springs G and G' fastened on the flanges F' and F² respectively, of the sleeve F, so that a yielding connection is made between the said wheel E and the sleeve F. Now, it will be seen that by this yielding connection, the arms D are normally held in an outermost position, as indicated in Figs. 1 and 3, so that their ends D' project a suitable distance beyond the peripheral surface of the rim A. Now, when the wheel passes over ground which is very soft, then of course, the projecting ends D' pass a considerable distance into the ground to cause proper traction, but when the ground becomes somewhat harder then the projecting ends D' in passing onto the ground meet considerable resistance, which forces the said projecting ends, and consequently the sliding arms D inwardly, whereby a slight turn is given to the wheel E, and as the latter is yieldingly connected by the coil springs G and G' with the sleeve F, such movement readily takes place, and as soon as the wheel again passes into soft ground, then the wheel E again returns to its normal position.

The flange F' of the sleeve F is provided on its periphery with teeth, as plainly indicated in Fig. 5, the said teeth being engaged by a worm H held on a worm shaft H' journaled in suitable bearings attached to the inner face of the flange C' of the hub C. One end of the shaft H' is formed with a head H² adapted to be engaged by a wrench or other tool so as to permit the operator to conveniently turn the said shaft H' and consequently the worm H to cause the toothed flange F', and consequently the sleeve F to turn on the hub C. This movement of the sleeve F causes a tightening or loosening of the springs G and G', so that their tension is either increased or decreased, according to the direction in which the operator turns the worm shaft H'. It will also be seen that the worm H, by engaging the toothed flange F' locks the sleeve F in place, so that the wheel E has a yielding connection with the said locked sleeve F by the springs G and G', as previously described. When it is desired to fasten the arms D permanently in an outermost position, a pin I is employed, passed transversely through the flanges C', C², to engage an aperture E' in the wheel E, as plainly indicated in Figs. 1, 3 and 4.

When it is desired to lock the arms D in an innermost position, so that their ends D' do not project beyond the peripheral surface of the rim A, then the said pin I is engaged with an aperture $E^2$ in the wheel E, it being understood that the latter is turned either forward or backward so as to permit the insertion of the pin I in either the aperture E' or $E^2$, for the purpose above described.

In order to limit the turning of the wheel E in either direction a pin J is provided, held in the flanges C' and $C^2$ of the hub C, and passing through an elongated aperture $E^3$ arranged in the wheel E, as plainly shown in Figs. 2, 3 and 4. The outer ends D' of the slidable arms D are preferably made rectangular, square or polygonal in cross section, and the openings A' are correspondingly shaped, so as to prevent the said arms from turning in the rim A of the wheel.

It is understood that by the arrangement described, the projecting ends of the arms D are passed deep into the ground whenever the latter is soft, and when the ground becomes harder, then the projecting ends slide inwardly, so as to permit the machine to be pulled forward with comparatively less power than would be required if the ends projected the normal distance beyond the peripheral surface of the rim A at the time the wheel passes over harder ground. Now, when the machine is used only on very soft ground, then the wheel E is locked in place by the pin I engaging the aperture E' in the said wheel, so as to hold the arms in their outermost extended position. When the machine is transported over roads, &c., and the projecting ends of the arms are not desirable, then the pin I is engaged with the aperture $E^2$, so as to hold the wheel E locked in such a position that the ends D' of the slidable arms are withdrawn with the rim A of the wheel.

Having thus fully described our invention, we claim as new and desire to secure by Letters Patent—

1. A traction wheel provided with arms fitted to slide loosely at their outer ends in the rim of the wheel, a yieldingly mounted wheel concentric with the axle of the traction wheel and connected with the said arms and a spring against the action of which said wheel turns, substantially as shown and described.

2. A traction wheel, comprising movable arms fitted to slide at their outer ends in the rim of the wheel, a wheel mounted to turn on the axle of the traction wheel and connected with said arms, a sleeve held on the axle, and a yielding spring connection between the said sleeve and the said wheel carrying the arms, substantially as shown and described.

3. A traction wheel, comprising movable arms fitted to slide at their outer ends in the rim of the wheel, a wheel mounted to turn on the axle of the traction wheel and connected with said arms a sleeve held on the axle, a yielding spring connection between the said sleeve and the said wheel carrying the arms, and means, substantially as described, for turning the said sleeve so as to increase or decrease the tension of the yielding spring connection between the sleeve and the wheel, substantially as shown and described.

4. A traction wheel, comprising movable arms fitted to slide loosely at their outer ends in the rim of the wheel, a wheel mounted to turn on the axle of the traction wheel, and pivotally-connected with the said arms, and a locking device, substantially as described, for locking the said wheel in place in either of two positions for holding the said arms locked either in an outermost position or in an innermost position, substantially as shown and described.

5. A traction wheel, comprising movable arms fitted to slide loosely at their outer ends in the rim of the traction wheel, a wheel mounted to turn and concentric with the axle of the traction wheel, the said wheel being provided with an elongated aperture, and a fixed pin passing loosely through the said elongated aperture to limit the turning movement of the said wheel, substantially as shown and described.

6. A traction wheel provided with two series of apertures through its rim, the apertures of one series alternating with those of the other series, a series of arms sliding through said openings and a common spring controlled wheel or sleeve to which the inner ends of the arms are connected, substantially as described.

SYLVESTER WARNER.
OWEN E. COOK.

Witnesses:
PRIOR A. WARNER,
OLIVER P. WARNER.